United States Patent
Schaefer et al.

(10) Patent No.: US 7,045,109 B2
(45) Date of Patent: *May 16, 2006

(54) CONVERSION OF SODIUM BROMIDE TO ANHYDROUS HYDROBROMIC ACID AND SODIUM BISULFATE

(75) Inventors: Jared John Schaefer, Wyoming, OH (US); Corey James Kenneally, Mason, OH (US); Daniel Martin Bourgeois, Mason, OH (US); Deborah Jean Back, Cleves, OH (US)

(73) Assignee: Procter & Gamble, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/993,040

(22) Filed: Nov. 19, 2004

(65) Prior Publication Data

US 2005/0135990 A1   Jun. 23, 2005

Related U.S. Application Data

(63) Continuation-in-part of application No. 10/458,432, filed on Jun. 10, 2003, now abandoned, which is a continuation-in-part of application No. 10/265,812, filed on Oct. 7, 2002, now Pat. No. 6,811,763.

(51) Int. Cl.
*C01B 7/09* (2006.01)

(52) U.S. Cl. ............ 423/482; 423/481; 423/488; 423/520; 423/521; 423/551

(58) Field of Classification Search ............ 423/481, 423/482, 488, 520, 521, 551
See application file for complete search history.

(56) References Cited

U.S. PATENT DOCUMENTS

| | | | | |
|---|---|---|---|---|
| 1,379,731 A | * | 5/1921 | Theimer | 423/482 |
| 2,705,670 A | * | 4/1955 | Chao | 423/482 |
| 3,199,953 A | * | 8/1965 | Suzuki | 423/481 |
| 3,222,276 A | * | 12/1965 | Belohlav et al. | 210/754 |
| 3,445,188 A | * | 5/1969 | Heintz et al. | 423/482 |
| 3,756,930 A | * | 9/1973 | Weiss et al. | 205/620 |
| 3,954,577 A | * | 5/1976 | Levine | 205/549 |
| 4,053,376 A | * | 10/1977 | Carlin | 205/556 |
| 4,069,120 A | * | 1/1978 | Meyerand et al. | 205/340 |
| 4,203,813 A | * | 5/1980 | Grantham | 205/340 |
| 4,411,897 A | * | 10/1983 | Scartazzini | 514/207 |
| 4,788,323 A | * | 11/1988 | Suzukamo et al. | 560/124 |
| 5,304,359 A | * | 4/1994 | Duyvesteyn et al. | 423/22 |

FOREIGN PATENT DOCUMENTS

GB   1 332 425   10/1973

OTHER PUBLICATIONS

Alrich, Aldrich Chemical Company, Inc., 1990, pp. 714-715, 1160 (no month).*
Shao et al., Improved Method For The Preparation Of Dry Hydrogen Bromide, retrieved from STN Database accession No. 102:169100, XP002268165 Abstract.

* cited by examiner

*Primary Examiner*—Ngoc-Yen Nguyen
(74) *Attorney, Agent, or Firm*—Bryn T. Lorentz

(57) ABSTRACT

Process for the conversion of sodium bromide to anhydrous hydrobromic acid and sodium bisulfate, said process with the following sequential steps: reaction of sodium bromide and sulfuric acid in a solution of water to produce hydrobromic acid and sodium bisulfate wherein the conversion of sodium bromide is greater than about 99%; adsorption of iron bromide onto a solid adsorbent; separation of hydrobromic acid and water from the sodium bisulfate; separation and drying of hydrobromic acid; and solidification of the sodium bisulfate into a flaked or granular form.

26 Claims, No Drawings

CONVERSION OF SODIUM BROMIDE TO ANHYDROUS HYDROBROMIC ACID AND SODIUM BISULFATE

CROSS-REFERENCE TO RELATED APPLICATIONS

This application is a continuation-in-part of U.S. application Ser. No. 10/458,432 filed Jun. 10, 2003 now abandoned, which is a continuation-in-part of U.S. application Ser. No. 10/265,812, filed Oct. 7, 2002 now U.S. Pat. No. 6,811,763.

FIELD OF INVENTION

The present invention relates to the conversion of sodium bromide to hydrobromic acid and sodium bisulfate with improved product quality and improved process economics.

BACKGROUND OF THE INVENTION

Hydrobromic acid is widely used as an intermediate in the chemical industry. It is utilized in the production of inorganic bromides by reaction with metal hydroxides, oxides, or carbonates; in the production of organic bromides by reaction with alkyl alcohols or alkenes; and as a catalyst for oxidations, alkylations, and condensations in organic chemistry.

Sodium bisulfate is an industrial and household acidulant with many different uses, including toilet bowl cleaners, cleaning compounds, swimming pool pH adjustment, pulp and paper processing, metal finishing, and food and beverage additives.

In the past, halogenated acids such as hydrobromic acid have been prepared in gaseous form by several laboratory methods such as direct combination of hydrogen and bromide, using platinized silica gel as a catalyst; bromination of organic compounds such as benzene, naphthalene, or tetrahydro-napthalene; and reacting bromine with red phosphorus and water. None of these processes are practical for the industrial production of hydrobromic acid. The first process is generally expensive and presents a considerable explosion hazard. The second process is inefficient and costly in that it typically utilizes only about half of the expensive bromine employed. The last is apt to be violent, difficult to control, and may present a serious explosion hazard.

Currently, there are two main approaches for the industrial production of hydrobromic acid. The first approach is a two conversion process whereby low purity, natural deposits of sodium bromide are converted first into elemental bromine and second into hydrobromic acid. The first conversion is done by oxidation with chlorine, where the sodium bromide is converted into sodium chloride and bromine by the reaction:

$$2NaBr+Cl_2 \rightarrow 2NaCl+Br_2$$

According to Stanford Research Institute's Chemical Economics Handbook, commercial bromine suppliers such as Great Lakes Chemicals (located in El Dorado and Marysville, Ak.), Albemarle (located in Magnolia, Ak.), and Dead Sea Bromine Co. (located in Sdom, Israel), currently practice this step. A second conversion involves either (a) burning bromine and hydrogen to form hydrobromic acid, such as discussed in Ullman's Encyclopedia of Industrial Chemistry, 5$^{th}$ edition, 1985, Volume A4, pg. 396, according to the reaction:

$$Br_2+H_2 \rightarrow 2 HBr$$

or (b) by an electrolytic process whereby a solution of bromine is converted into hydrobromic acid and oxygen (as disclosed in U.S. Pat. Nos. 4,069,120 to United Technologies Corporation, issued Jan. 17, 1978 and 4,203,813 to United Technologies Corporation, issued May 20, 1980), according to the reaction:

$$2Br_2+2H_2O \rightarrow 4HBr+O_2$$

This two conversion process to produce hydrobromic acid has a number of drawbacks. First, operating and capital costs are high since a separate manufacturing plant is employed for each conversion. In addition, if bromine burning is implemented, free bromine is often present in the hydrobromic acid product, resulting in a product with the characteristic yellow and/or orange color associated with free bromine. This is generally unacceptable for applications requiring a colorless hydrobromic acid product.

The second approach for chemical manufacture of hydrobromic acid is a one conversion process whereby high purity sodium bromide is reacted with sulfuric acid (U.S. Pat. Nos. 1,379,731 to Lowenstein Radio Corporation, issued May 31, 1921 and U.S. Pat. No. 2,705,670 to American Cyanamid, issued Apr. 5, 1955) according to the reaction:

$$NaBr+H_2SO_4 \rightarrow HBr+NaHSO_4$$

This approach is well suited for industrial companies which wish to convert high purity sodium bromide to hydrobromic acid and sodium bisulfate products. However, this approach has a number of drawbacks as well. First, if the hydrobromic acid is of low purity, then product applications are limited and/or capital and operating costs are high to purify the material. This can occur if (a) significant levels of bromine are generated from hydrobromic acid via the following reaction, $$2 HBr+H_2SO_4 \rightarrow Br_2+SO_2+2H_2O$$

or, (b) the hydrobromic acid is not sufficiently free of water. Second, if the sodium bisulfate salt is of low purity, then product applications are limited and/or capital and operating costs are high to purify this material as well. This can occur if (a) iron bromide is present in the sodium bisulfate at levels sufficient to impart an orange color to the product, (b) significant quantities of sodium bromide or hydrogen bromide are left in the sodium bisulfate, (c) a significant portion of sodium bisulfate reacts with sodium bromide to produce sodium sulfate, according to the reaction:

$$NaHSO_4+NaBr \rightarrow HBr+Na_2SO_4$$

or, (d) the sodium bisulfate undergoes decomposition to sodium pyrosulfate via the following reaction, $$2 NaHSO_4 \rightarrow Na_2S_2O_7+H_2O$$

Therefore, there is a continuing need for an improved process approach for making anhydrous hydrobromic acid and sodium bisulfate. Specific areas for improvement vs. current commercial processes include improving product purity, reducing operating cost, and reducing capital cost.

SUMMARY OF THE INVENTION

It has now surprisingly been discovered that sodium bromide can be converted into anhydrous hydrobromic acid (also referred to as hydrogen bromide) and sodium bisulfate with minimal levels of by-products such as bromine, bromides, sulfuric acid, or sodium pyrosulfate by using a one conversion process consisting of a simple reactor and three simple separation processes.

The present invention therefore relates to a process for the conversion of sodium bromide to hydrobromic acid and sodium bisulfate with the following steps:

1) Reaction of sodium bromide and sulfuric acid in a solution of water to produce hydrobromic acid and sodium bisulfate
2) Optional adsorption of iron bromide onto a solid adsorbent
3) Separation of hydrobromic acid and water from the sodium bisulfate
4) Separation of hydrobromic acid from water; followed by drying of the hydrobromic acid
5) Optional solidification of the sodium bisulfate into a flaked or granulated form These and other features, aspects, and advantages of the present invention will become evident to those skilled in the art from a reading of the present disclosure.

All documents cited are, in relevant part, incorporated herein by reference; the citation of any document is not to be construed as an admission that it is prior art with respect to the present invention.

DETAILED DESCRIPTION OF THE INVENTION

While the specification concludes with the claims particularly pointing and distinctly claiming the invention, it is believed that the present invention will be better understood from the following description.

All percentages and ratios used herein are by weight of the total composition and all measurements made are at 25° C., unless otherwise designated.

Without being limited by theory, it is believed that economical, commercial production of anhydrous hydrobromic acid from concentrated sodium bromide is best accomplished by: a one conversion process (which avoids elemental bromine as an intermediate) that (a) maximizes the yield and purity of both hydrobromic acid and sodium bisulfate, and (b) minimizes the number of unit operations in the overall process.

These objectives are accomplished by: (a) high conversion of sodium bromide using a single, simple reactor, whereby the conversion is greater than about 99%, preferably greater than about 99.9%, (b) selective production of hydrobromic acid with less than about 200 ppm bromine and 100 ppm water and greater than about 99% theoretical yield of hydrobromic acid, preferably with no detectable level of bromine, 50 ppm or less water, and greater than about 99.9% theoretical yield, (c) optional removal of iron bromide (if present) to a level of less than 1 ppm in sodium bisulfate, which corresponds to a pure white or cream color, (d) optional removal of residual hydrobromic acid in sodium bisulfate, (e) selective production and separation of sodium bisulfate with purity between 91.5% and 95.5%, the balance being primarily sodium sulfate with less than 0.5% water, and (f) accomplishing all of the separations using commercially available separation devices, preferably three or fewer devices, more preferably all conducted in a liquid product state. To obtain a pure white or cream color of sodium bisulfate, the specified level of residual hydrobromic acid in sodium bisulfate required is dependent on the level of iron that is also present in the sodium bisulfate. The following data points suggest the required residual hydrobromic acid level that may be necessary for pure white or cream color sodium bisulfate depending on the level of iron; <100 ppm for <30 ppm iron, <50 ppm for <60 ppm iron, <10 ppm for <90 ppm iron, <1 ppm for <120 ppm iron, and <100 ppb for <200 ppm iron, The present invention has several advantages over the current practice. High conversion of sodium bromide in a single, simple reactor is advantageous over the two conversion process and also the existing one conversion process for the case of substantially lower sodium bromide conversion which requires separation and recycle steps for the unreacted sodium bromide and sulfuric acid. The selective production of hydrobromic acid with minimal levels of bromine and water is advantageous over current practice where higher levels of bromine and water are present from both a process materials standpoint (bromine is more corrosive) and from a product quality standpoint. The selective production of sodium bisulfate with minimal bromide, sulfuric acid, or sodium pyrosulfate contaminants is advantageous to maximize the value of the salt for use in the broadest variety of applications, including food and beverages. Finally, the use of preferably three or fewer separation devices, more preferably in the liquid state, is advantageous over the current practice of using one or more liquid/solid separation devices, which are generally more expensive and of lower reliability than the liquid separation devices.

The processes and methods herein may also include a wide variety of other variations. The processes and methods of the present invention, are described in detail hereinafter.

The present invention relates to a process for the converting sodium bromide and sulfuric acid in a solution of water, under specified conditions, in order to produce hydrobromic acid and sodium bisulfate. The steps of such process are as follows:

I. Reaction of Sodium Bromide and Sulfuric Acid in a Solution of Water to Produce Hydrobromic Acid and Sodium Bisulfate All reactants and products according to the conversion of sodium bromide and sulfuric acid to produce hydrobromic acid and sodium bisulfate process outlined herein are soluble in water up to about 0.9 parts by weight NaBr/1 part H2O, and about 1.0 parts by weight sodium bisulfate/1 part H2O.

The reaction process consists of the blending of water, sodium bromide, sulfuric acid, and optionally a chemical additive to suppress formation of free bromine in a single miscible phase, resulting in complete conversion of reactants to their respective products.

Suitable chemical additives for suppression of free bromine include additional water, sulfur dioxide ($SO_2$), and various derivatives of $SO_2$ including sodium sulfite and sodium bisulfite. The chemistry for free bromine suppression is as follows:

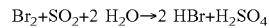

$$Br_2 + SO_2 + 2\ H_2O \rightarrow 2\ HBr + H_2SO_4$$

Preferred chemical additives include sodium sulfite and sodium bisulfite since they are typically non-hazardous, easy to handle, low cost, and soluble in water. The use of additional water to inhibit bromine is less preferred because it dilutes the products of the reaction, resulting in higher capital cost to remove the water in downstream separation steps. Suitable grades of sulfuric acid include technical grade and reagent grade, with technical grade preferred due to the typically lower cost. Suitable specifications for the technical grade material are color less than 100 APHA; less than 10 ppm lead, less than 30 ppm heavy metals as lead; and less than 40 ppm iron. Sulfuric acid may be of high concentration (about 97%) or it may be of lower concentration. The sulfuric acid may be added all at once to the sodium bromide solution, or it may be added slowly over time. Preferably, the sulfuric acid is added slowly over time (in a batch process) or diluted in the product stream (in a continuous process) in order to minimize the likelihood of degrading hydrobromic acid in the presence of concentrated sulfuric acid to free bromine and sulfur dioxide. Suitable grades of sodium bromide include industrial grade and reagent grade, with industrial grade preferred due to the low cost. Suitable specifications for the industrial grade material (on a dry basis) are assay >90%, sodium hydroxide <5%, organic substances <10 ppm, and no suspended solids.

Conversion of sodium bromide to its respective products is preferably greater than about 99%, more preferably greater than about 99.9%. In order to achieve this conversion, the molar ratio of sulfuric acid to sodium bromide is preferably between about 0.95 and about 1.05. A ratio of about 1.0 to about 1.05 moles of sulfuric acid per mole of sodium bromide is preferred to encourage the complete conversion of the sodium bromide. The ratio of sodium bromide to water is kept below the solubility limit of about 0.9 parts by weight sodium bromide/1 part $H_2O$. Preferably, the ratio is kept below about 0.8 parts by weight sodium bromide/i part $H_2O$ (or about 0.44 parts sodium bromide/l part solution) in order to keep the sodium bisulfate from precipitating out over a range of reaction temperatures. Suitable levels of sodium sulfite are 10 ppm to 1000 ppm on a total solution basis, with preferred levels of 100–500 ppm on a total solution basis. Temperature for the reaction is from about 20° C. to about 180° C., preferably from about 20° C. to about 100° C. at one atmosph pressure, more preferably from about 50° C. to about 90° C. at one atmosphere pressure.

A variety of different reactor designs can be used, including tanks, columns, and pipes, with a wide range of length/diameter ratios. One example of a commercially available device is the Buss Loop Reactor supplied by Davy Process Technology (Switzerland) AG. Internal blending devices useful herein include baffles, agitators and jets for tanks and columns; and orifice plates, segmented baffles, or static mixers for columns and pipes. Suitable agitators for tanks and columns include helical ribbons, screws, or anchors for laminar mixing; and turbines, propellers, or hydrofoils for turbulent mixing. Suitable static mixers for pipes include the multi-element, helical design from Kenics. An industry guideline is that blending of miscible solutions is generally excellent after about 6–20 static mixer elements. Alternatively, a pipe reactor can be used with no internals for blending but with turbulence provided solely by high throughput velocity. The high throughput velocity is preferably provided by a pump, such as those commonly known in the art, including centrifugal and positive displacement pumps.

The reactor can be backmixed or plug flow, but backmixing is preferred, since it provides dilution of sodium bromide and sulfuric acid, thereby minimizing the likelihood of degrading hydrobromic acid in the presence of concentrated sulfuric acid to produce free bromine and sulfur dioxide. Both batch and continuous reactors can be used. The reactor can be designed for adiabatic or isothermal operation, the latter with a jacket or heat exchanger to remove the heat of reaction. The degree of blending required for complete conversion is a complex function of the type of reactor used, geometry factors, and fluid properties. For a turbine-agitated baffled tank operating in the turbulent regime (impeller Reynold's number >about $10^4$), about 30 seconds of contact time is sufficient. By contrast if operating in the laminar regime (impeller Reynold's number <about 10), or the transition regime (impeller Reynold's number from about 10 to about $10^4$), mixing time is generally about 2–20 times longer. Mixing guidelines for miscible fluids using different agitators or liquid jets can be found in the textbook, "Unit Operations of Chemical Engineering", by McCabe and Smith, Third Edition, McGraw-Hill, 1976, pp. 248–249.

A preferred reactor is an adiabatic loop reactor, which is a continuous, recirculating tubular reactor with backmixing. The feed rate and outlet rate are balanced so that accumulation is kept constant in the loop. The Reynolds number is greater than about $10^3$, preferably greater than about $10^4$, thereby providing what is commonly referred to as a "turbulent flow regime." The recirculation rate is about ten times the combined feed rate of the sodium bromide, water, and sulfuric acid, preferably about twenty times, more preferably about thirty times the combined feed rate. The residence time in the loop is between about 0.2 and about 20 minutes, preferably between about 0.5 and about 10 minutes, most preferably between about 1 and about 5 minutes.

II. Mitigation Techniques for Iron Bromide Formation

Iron bromide ($FeBr_3$) forms as a by-product in the reaction between sodium bromide and sulfuric acid. It is an orange colored material of low volatility, which if not removed, carries over to the products of the reaction (hydrobromic acid and sodium bisulfate) and discolors the final product. When technical grade sulfuric acid is used, iron is typically present at levels of about 5 to about 50 ppm. Iron may also be introduced from the sodium bromide material as well. When iron is present in sulfuric acid, the reaction to produce iron bromide is as follows:

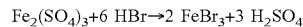

$$Fe_2(SO_4)_3 + 6\ HBr \rightarrow 2\ FeBr_3 + 3\ H_2SO_4$$

There are at least four approaches that may optionally be used to minimize the color impact of iron bromide in the aforementioned products of the reaction. First, reagent grade sulfuric acid and sodium bromide with iron contents below 0.2 ppm can be used. This level of iron is sufficiently low to eliminate any traces of color in the products of the reaction. A second option is to use a chemical additive to convert iron bromide to an alternate iron species, such as iron sulfate or iron chloride, that imparts less color to the products of the reaction. A third option is to remove the iron by adsorption onto a porous solid. While not wishing to be bound by theory, it is believed that the iron bromide is chemisorbed onto the surface of certain porous solids. Adsorption can be done at virtually any stage of the process for making hydrobromic acid and sodium bisulfate but removal after the reaction step and before the separation steps is preferred, since the material at this stage is an aqueous acid stream with low viscosity and moderate acid strength. Treatment of streams with higher acid strength (i.e 97% sulfuric acid) or higher viscosity (i.e. molten sodium bisulfate) is also optional, but less preferred due to lower adsorption efficiencies and higher pressure drops. A fourth option to mitigate the color impact of iron bromide that allows the iron to remain in the system but does not require any chemical additive is to achieve a specified level of residual hydrobromic acid in the sodium bisulfate. The specified hydrobromic acid level would be achieved through careful determination of conditions in Step III (described in the subsequent section). The required level of residual hydrobromic acid to form pure white or cream sodium bisulfate is dependent on the level of iron also present in the sodium bisulfate. The table below gives the required hydrobromic acid removal from sodium bisulfate for a range of iron levels.

| Iron Level in Sodium Bisulfate | Hydrobromic Acid Level in Sodium Bisulfate |
|---|---|
| <30 ppm | <100 ppm |
| <60 ppm | <50 ppm |
| <90 ppm | <10 ppm |
| <120 ppm | <1 ppm |
| <200 ppm | <100 ppb |

If adsorption is selected, suitable adsorbents include activated carbon, silica gel, and alumina in either a powdered or a granular form. A preferred adsorbent is activated carbon sourced from coal, coconut, or wood materials, washed with phosphoric acid to remove iron and ash, with a surface area of 800–1800 m2/gr, an internal porosity of 60–80%, an average pore diameter of 2–4 nanometers, and an iron content of <1000 ppm. A suitable particle size is <100 mesh for slurry operations and 12 to 40 mesh for packed beds. Mixtures of more than one adsorbent may be used.

As used herein, a "slurry operation" generally refers to a powdered carbon, added to a liquid stream containing hydrobromic acid, sodium bisulfate, and iron bromide, mixed for a period of time in a batch or a continuous flow vessel, and then filtered to separate out the adsorbent from the purified liquid. Suitable vessels for mixing include tanks, pipes, reactors, and the like, with enough mixing or turbulence to keep the carbon suspended in the slurry. Suitable temperatures include from about 20° C. to about 100° C. at atmospheric pressure, preferred temperatures include from about 50° C. to about 80° C. Suitable mixing times include from about 20 minutes to about 48 hours, with from about 4 to about 8 hours preferred to achieve equilibration between the aqueous solution and the carbon. Suitable usage levels include from about 0.005% to about 2%, by weight, carbon in the slurry. Preferred usage levels are from about 0.02% to about 0.2%. Suitable equipment for filtering the carbon from the aqueous stream is reviewed in Chapter 18 of "Perry's Chemical Engineers Handbook", by Green (ed), McGraw-Hill, 7$^{th}$ edition. These include batch cake filters such as a filter press, liquid bag filter, or Nutsche filter, and continuous filters such as a rotary drum or a horizontal vacuum filter. A combination of more than one filter may be used.

As used herein, a "packed bed operation" refers to granular carbon generally contained in a vertical column. The carbon can be fixed in the column, or there can be continuous flow whereby spent carbon is substantially continuously replaced with fresh carbon. The most common operation is a fixed bed of carbon with continuous flow of liquid, with periodic interruption for regeneration. Suitable conditions include a column flux rate of from about 0.5 to about 4 gpm/ft2, a liquid residence time of from about 10 minutes to about 2 hours, and temperatures of from about 20° C. to about 100° C. at atmospheric pressure, preferred temperatures including from about 50° C. to about 80° C. As used herein, "regeneration" refers to the steps of physically removing the spent carbon from the column and replacing with fresh carbon; or a clean-in-place system where soaking with water and caustic streams serves to desorb the iron bromide from the bed, after which fresh aqueous acid, rich in iron bromide, can be adsorbed onto the solid again.

III. Separation of Hydrobromic Acid and Water From the Sodium Bisulfate

Coming out of the reaction step and either of the first three color mitigation options (if selected), a miscible solution of hydrobromic acid, sodium bisulfate, and water is present. The first separation is conducted between sodium bisulfate and hydrobromic acid/water. This separation step may also enable the fourth color mitigation option outlined above if iron bromide is present that has not been mitigated through the other three options. Suitable devices for the separation include evaporators and dryers, where liquid/liquid or liquid/solid separation between volatiles and non-volatiles is done using either single or multiple equilibrium stages. Other liquid/solid separation devices such as crystallizers, centrifuges, and filters may be used, but the evaporators and dryers are preferred, as the crystallizers, centrifuges and filters all require some removal of volatile material before a solid precipitate can be removed.

Suitable types of evaporators are reviewed in Chapter 11 of "Perry's Chemical Engineers Handbook", by Green (ed), McGraw-Hill, 7$^{th}$ edition. These include forced circulation, vertical and horizontal tube (including rising film and falling film evaporators), jacketed kettles, and agitated thin film devices (i.e. wiped film evaporators from Pope Scientific and the Rototherm® by Artisan Industries). Suitable types of dryers are reviewed in Chapter 12 of Perry's and include pan dryers, indirect rotary dryers, fluidized beds, spray dryers, and drum dryers. One can select a single type of device for the separation or a combination of two or more devices, i.e. a falling film evaporator in combination with a spray dryer.

A preferred separation device is a forced circulation evaporator, which is designed to handle corrosive solutions and crystalline products. Non-circulating evaporators are better suited for clear liquids with no crystalline product. The evaporator can be either single effect or multiple effect, the latter having the vapor from one effect as the heating medium for another effect in which boiling takes place at a lower temperature and pressure.

Evaporation temperatures and pressures are dependent on the required residual moisture and/or hydrobromic acid specification for the sodium bisulfate salt. For monohydrate salt, temperatures and pressures are from about 20° C. to about 183° C. and from about 0.002 atm to about 5 atm. respectively. For anhydrous salt, temperatures and pressures are from about 80° C. to about 270° C. and from about 0.002 atm to about 5 atm respectively. Preferably, the temperature is from about 60° C. to about 120° C. for the monohydrate salt and from about 170° C. to about 270° C. for anhydrous salt so that the salt is in a generally molten form and very little or no crystallized solids are present. If the fourth iron bromide color mitigation technique is to be used, the following table gives the approximate temperatures required for various iron levels to achieve pure white or cream sodium bisulfate.

| Iron Level in Sodium Bisulfate | Approximate Evaporation Temperature Required to Achieve Pure White or Cream Sodium Bisulfate |
|---|---|
| <30 ppm | 200° C. |
| <60 ppm | 220° C. |
| <90 ppm | 250° C. |
| <120 ppm | 260° C. |
| <200 ppm | 270° C. |

Processing the salt in a molten state minimizes the chances of fouling in a forced circulation evaporator and also allows the opportunity to use non-circulating evaporators for the separation. In addition, processing the salt in a molten state is preferable for separating low levels of hydrobromic acid and water from the salt. Residence times in the evaporator are from about 2 seconds to about 20 minutes, preferably from about 10 seconds to about 1 minute. Residual moisture content for the anhydrous salt is less than about 1%, preferably less than about 0.5%, more preferably less than about 0.2%, most preferably less than 0.05%.

Care must be taken to avoid thermal decomposition of the sodium bisulfate to form sodium pyrosulfate. According to Ullman's Encyclopedia of Industrial Chemistry, 5$^{th}$ edition, 1985, Volume A24, pg. 366, this transition takes place near the melt point of anhydrous sodium bisulfate (about 183° C.) and is complete after heating for approximately four hours at from about 240° C. to about 260° C. Accordingly, exposure to temperatures above about 200° C. during the evaporation step should be kept to less than about ten minutes, preferably less than about five minutes, and more preferably less than about one minute. Additionally, if certain levels of sodium pyrosulfate are formed during the evaporation, water may be added in a subsequent step to revert the sodium pyrosulfate back to sodium bisulfate.

IV. Separation of Hydrobromic Acid From Water, Followed by Drying of Hydrobromic Acid Separation of hydrobromic acid from water can be accomplished using a number of different approaches, including multi-stage distillation, liquid extraction, and membrane separation. Hydrobromic acid forms an azeotrope with water at about 48% acid concentration at one atmosphere pressure. Thus for the case of distillation, azeotropic distillation is required in order to separate hydrobromic acid from water. Approaches for azeotropic distillation include choosing an entraining agent to alter the vapor liquid equilibrium (and optionally the liquid phase miscibility) of hydrobromic acid and water to enable separation of hydrobromic acid, exploiting changes in azeotropic composition with total system pressure, and exploiting curvature in the vapor-liquid equilibrium diagram. For further detail, see Chapter 13 of "Perry's Chemical Engineers Handbook", by Green (ed), McGraw-Hill, 7$^{th}$ edition. Examples of the first approach include ethanol in water and pyridine in water (using benzene as an entrainer). Examples of the second approach include THF in water and ethanol in water. Examples of the third approach include hydrochloric acid in water and nitric acid in water, with sulfuric acid as an entrainer.

Preferably, pressure swing azeotropic distillation is used to separate hydrobromic acid from water. Liquid extraction or membranes may also be used, but these are less preferred due to introduction of additional chemical agents and/or due to high capital and operating costs. Pressure swing azeotropic distillation takes advantage of the fact that the azeotropic composition of hydrobromic acid in water generally decreases upon an increase in pressure. By operating two distillation columns in series at different pressures (the second one at a higher pressure than the first), the composition of hydrobromic acid from the first column will generally be above the azeotropic composition for hydrobromic acid in the second column. This allows one to obtain pure hydrobromic acid out of the second column without running into any barriers from the azeotrope.

Distillation operations are usually carried out in vertical, cylindrical columns or towers in which devices such as plates or packing elements are placed. The vapor and liquid streams normally flow countercurrently and the devices serve to provide the contacting and development of interfacial surface through which mass transfer takes place. Sieve trays, bubble cap trays, structured packing, and loose packing such as rings or saddles are examples of column internals that may be used herein.

Preferred operating conditions for the first column are a pressure of from about 0.01 to about 2 atmospheres and a bottoms temperature of from about 50° C. to about 140° C. As used herein, "tops" refers to the vapor or relatively more volatile stream that is separated from the relatively less-volatile or "bottom" stream in distillation columns. The "tops" is also sometimes referred to as "overhead" in the art. With from about 2 to about 20, preferably from about 3 to about 10, most preferably about 5 separation stages and a mass reflux ratio of from about 0.1 to about 10, preferably from about 0.5 to about 2, most preferably about 1.0, the bottoms composition of hydrobromic acid in water is increased to its azeotrope for the corresponding operating pressure. The tops composition is nearly pure water. Preferred operating conditions for the second column are a pressure of from about 1 to about 20 atmospheres with a bottoms temperature corresponding to the boiling point at a given pressure. With from about 2 to about 20, preferably from about 3 to about 10, more preferably about 5 separation stages and a mass reflux ratio of from about 0.1 to about 10, preferably from about 0.5 to about 5, more preferably about 2.5, the composition of the hydrobromic acid in water is increased from about 48% to about 99% or greater and taken overhead as a nearly anhydrous gas product. The bottoms from the second column are at the azeotropic composition corresponding to its operating pressure and are sent back to the first distillation column as a feed stream.

After the separation of hydrobromic acid from water, there may still be residual moisture in the hydrobromic acid product. In order to produce an anhydrous hydrobromic acid (also referred to as hydrogen bromide), a drying step is utilized. As referenced herein, "anhydrous" hydrobromic acid according to the present invention has a residual moisture content below about 0.4%, preferably below about 0.2%, more preferably below about 0.1%. In order to produce anhydrous hydrobromic acid, several different approaches can be employed, including distillation, stripping, solids adsorption, gas separation membranes, and gas absorption. Distillation can be used, and is especially preferred if it is incorporated as part of the design of the aforementioned distillation column used to remove the bulk of the water from hydrobromic acid. Alternatively, stripping with a supercritical gas at low temperatures and high pressures may be used. Adsorption onto a solid adsorbent is another approach that is commonly used for drying gases. Solid adsorbents, typically in granular, bead, or pellet form, can be used in adsorbers with either fixed inventory, intermittent solids flow, or with continuous moving solids flow. The most common are fixed beds operating as batch units or as beds through which the gas passes with period intervention for regeneration. Regeneration is accomplished using either temperature swing (higher temperature during desorption) or pressure swing (lower pressure during desorption). A commercial example of this approach is instrument air dryers which use pressure swing adsorption with either activated alumina or silica gel as the sorbent. A specific, low cost device for adsorption (particularly for removal of VOCs) is the adsorbent wheel. The gas to be treated flows through the wheel parallel to the axis of rotation. Most of the wheel removes adsorbates. The remaining part undergoes thermal regeneration, usually countercurrent. Dehydration of air and other gases is a rapidly growing membrane application. Gas membranes generally work because individual gases differ in their solubility and diffusivity through nonporous polymers. Water is extremely permeable in polymer membranes. Finally, gas absorption, also known as scrubbing, can be used by passing hydrobromic acid vapor through a packed bed or tower in countercurrent flow to a liquid absorbate. As used herein, "liquid absorbate" refers to a liquid stream which absorbs the water vapor into the liquid phase. While a variety of non-volatile liquid streams can be used to absorb moisture, sulfuric acid is a preferred liquid absorbate for this application since it is already used in the reaction process, and the liquid absorbate from the scrubber column can then be used "as is" in the reaction step.

V. Solidification of the Sodium Bisulfate Into a Flaked or Granulated Form

Many applications of sodium bisulfate are for a powdered or granular material which can be easily dispersed or dissolved in water. Additional steps may be taken in order to ensure that the finished product is in flaked and/or granulated form. As used herein, "solidification" refers to the process whereby molten salt from the evaporator is crystallized and shaped into a particle with the proper shape, density, and particle size. A variety of different processes can be used to solidify the molten material, including flaker rolls, mechanical mills, pastillators, extruders, and prilling towers. Other processes whereby water or steam is added to the molten salt in order to generate evaporative cooling during both crystallization and drying include spray dryers, spray congealers, and fluidized bed granulators. Particle shape and particle size will vary according to the type of process used. Flakers will generate ¼" to 1" diameter irregular particles with thickness of about 0.5 to 3 mm. Mechanical mills will generate high density, irregular shaped granules or powders, with a diameter generally below 1 mm. Spray dryers will generate low density powders. Pastillators will generate spheres or hemispheres with a diameter of about 1 mm to 5 mm. Prilling towers, spray congealers, and fluid bed granulators will generate high density, spherical shaped particles with a diameter ranging from 300 microns to several millimeters. For all of the solidification processes, sieving may optionally be used to segregate the desirable from the undesirable particle sizes if necessary. Oversize and undersize particles can be recycled back as either molten salt or as "seed" material for solidification processes where the particle diameter is built up in layers, as in fluidized bed granulation.

Temperatures useful for solidification processes without drying are from about 160° C. to about 220° C. Preferably the temperature is about 200° C. and the pressure is atmospheric. For solidification processes involving drying, a useful temperature range for the inlet air is from about 20° C. to about 225° C., preferably from about 40° C. to about 90° C. The air velocity required to fluidize the particles ranges from about 1 to about 7 ft/sec, preferably about 3 ft/sec. Water or steam addition ranges from about 2% to about 50%, by weight of the sodium bisulfate product exiting the dryer, more preferably from about 5% to about 10%, by weight water or steam. Operating pressure in the dryer ranges from about 0.01 atm to about 2 atm, preferably from about 0.9 atm to about 1.1 atm. Residence time ranges from about 1 second to about 3 hours, preferably from about 2 minutes to about 2 hours.

EXAMPLES

The following examples further describe and demonstrate embodiments within the scope of the present invention. The examples are given solely for the purpose of illustration and are not to be construed as limitations of the present invention, as many variations thereof are possible without departing from the spirit and scope of the invention.

The following analytical methods are referenced in the examples.

Bromine in aqueous hydrobromic acid. Weigh about 50 grams of sample into a 250 ml. Erlenmeyer flask. Add 20 ml. of a 10% potassium iodide solution in water and 15 ml. of glacial acetic acid. Titrate the liberated iodine with 0.02 Normality sodium thiosulfate until only a slight yellow color of free iodine remains. % Bromine=(ml. of sodium thiosulfate×Normality×79.92)/(10×grams sample).

Hydrobromic acid solution: apparent yield. % yield=[(grams hydrobromic acid solution recovered)/(gr. water added+gr. moles sodium bromide added×80.9)]×100

Sodium bisulfate: apparent purity. Weigh about 1.0 grams of sample into a 250 ml. beaker. Add approximately 75 ml. of distilled water and titrate to pH 7.0 with 0.1 Normality standard sodium hydroxide solution using a pH meter. Calculation: % sodium bisulfate=(ml. of sodium hydroxide× Normality×120.1)/(10×grams sample).

Sodium bisulfate: apparent yield. % yield=(grams solid residue recovered)/(gr. moles sodium bromide added× 120.1)×(100-sodium bisulfate moisture)

Sodium bisulfate moisture. Weigh out 1–2 grams of finely ground sample on a small pan. Place in an oven at 210° C. and atmospheric pressure for 30 minutes. Cool and weigh the sample again. Record the difference in weight as a percentage of total.

Example 1

This example is a batch reaction between sodium bromide and sulfuric acid under conditions where the quality and yield of the hydrobromic acid and sodium bisulfate are maximized. 63.5 grams (0.62 gram moles) of sodium bromide from EM Science was dissolved in 175 grams (9.72 gram moles) water in a 500 ml round bottom flask with a heating mantle, agitator, overhead condenser, receiver flask, and dry ice trap. The mixture was heated to 80° C. with agitation and then 62.1 grams (0.62 gram moles) of 97% sulfuric acid (reagent grade) was added dropwise over a period of 20 minutes to the reaction flask. The product in the reactor was colorless through the duration of sulfuric acid addition. After all sulfuric acid was added, the mixture was heated to evaporate hydrobromic acid and water. A steady stream of vapor was condensed from the reactor over a temperature range of 115° C. to 130° C. (The hydrobromic acid/water azeotrope boils at 125° C. at one atmosphere pressure.) The sodium bisulfate salt was further dehydrated in the reactor over a temperature range of 130° C. to 175° C. The melt point of the nearly anhydrous salt was observed to be about 150° C. The apparent yield of the hydrobromic acid solution was 101% and the apparent yield of the sodium bisulfate salt was 98%. The hydrobromic acid/water azeotrope was not purified in the lab. However, an ASPEN computer simulation indicated that hydrobromic acid can be separated from water (up to 99.5% purity) using the following design specs.

|  | Column 1 | Column 2 |
|---|---|---|
| Bottoms pressure, atm | 0.15 | 8.0 |
| Bottoms temperature, ° C. | 79 | 188 |
| Theoretical stages | 5 | 5 |
| Mass reflux ratio | 1.1 | 2.5 |
| % HBr - tops | 0.5 | 99.5 |
| % HBr - bottoms | 49.3 | 37.2 |

Product Analysis

The hydrobromic acid/water solution was titrated with 0.1 N caustic and a strong acid content of 22.3% was measured (vs. a theoretical concentration of 22.2%). Bromine levels were non detectable. Elemental analysis by ICP indicated that the residual sodium and sulfur levels were 10 ppm and 44 ppm, respectively. The sodium bisulfate product was also subjected to elemental analysis using ICP. The sodium and sulfur levels were 19.1% and 26.5% by weight respectively. The apparent purity of the sodium bisulfate was 95%.

Example 2

This example is similar to Example 1 except more concentrated solutions of sodium bromide in water are used in the reaction. As in Example 1, a reaction stoichiometry of 1 mole sulfuric acid to 1 mole sodium bromide was used. Sulfuric acid was added to the sodium bromide solution over a period of 20–40 minutes. Hydrobromic acid solution was evaporated from the sodium bisulfate and the sodium bisulfate was dried to a moisture content of 2% or less. Bromine content and apparent yield of the hydrobromic acid solution was measured, along with apparent purity and apparent yield of the sodium bisulfate.

|  | Hydrobromic Acid Solution | | Sodium Bisulfate | |
|---|---|---|---|---|
| NaBr:H2O mass ratio | Br2 conc. | % Yield | % Purity | % Yield |
| 0.64:1.0 | 0 ppm | 100 | 97.5 | 102 |
| 0.7:1.0 | 92 ppm | 99 | 89.5 | 103 |
| 0.89:1.0 | 105 ppm | 99 | 92.5 | 102 |
| 1.03:1.0 | 143 ppm | 98 | 92.4 | 98 |
| 1.17:1.0 | 234 ppm | 93 | 98.5 | 98 |

The results show that as the concentration of sodium bromide is increased, the concentration of bromine in the hydrobromic acid/water solution is increased proportionally. Also, the yield of hydrobromic acid solution and sodium bisulfate is decreased.

Example 3

This example is similar to the first data point in Example 2 (0.64:1.0 mass ratio of sodium bromide:water) except that the sulfuric acid is added all at once instead of slowly over a period of 20–40 minutes. 27.6 grams (0.27 gram moles) of sodium bromide was dissolved in 42.9 grams (2.38 gram moles) of water and then 26.3 grams (0.27 gram moles) of 97% sulfuric acid was immediately added to the sodium bromide solution. The free bromine concentration in the hydrobromic acid solution was 81 ppm. This result indicates the rate of addition of sulfuric acid is an important variable to control in the batch process in order to ensure no detectable levels of free bromine.

Example 4

This example is similar to example 1 except that the reaction and the evaporation steps are done in continuous flow rather than in a batch process. 65.8 grams/min (0.64 gram moles/min) of dry sodium bromide and 187.2 grams/min (10.4 gram moles/min) of water were conveyed using a peristaltic pump (Cole Parmer). 67 grams/min (0.66 gram moles/min) of 97% sulfuric acid (reagent grade) was conveyed using a second peristaltic pump. The output from the two pumps was combined and fed to a non-recirculating plug flow reactor. The reactor consisted of 3.2 mm id×65 ft long Viton tubing with a residence time of 30 seconds and a Reynolds number of approximately 2100. The crude product from the plug flow reactor was then fed at a rate of approximately 2–5 ml/minute through a 2" wiped file evaporator (Pope Scientific) with an internal condenser. Operating conditions were a pressure of 200 mm Hg and a jacket temperature of 160° C. 75° F. cooling water was circulated through the condenser. The hydrobromic acid and water were vaporized and recondensed and the sodium bisulfate was collected as a powdery, non-volatile residue.

Product Analysis

The crude reaction product was analyzed for bromine content and the result was 112 ppm. The hydrobromic acid/water solution that was flashed and recondensed in the evaporator was titrated with 0.1 N caustic and a strong acid content of 21.3% was measured (vs. a theoretical concentration of 21.7%). The sodium bisulfate residue from the evaporator had an apparent purity of 95%. The moisture level of the sodium bisulfate was 1%.

Example 5

This example demonstrates the removal of iron from a mixture of hydrobromic acid, sodium bisulfate, and water using a continuous flow loop reactor and a fixed bed of activated carbon. The activated carbon was Calgon CPG granular 12×40 mesh. A glass column jacketed with hot oil, with dimensions of 2" inside diameter and 20" length, was filled with carbon. The carbon was soaked in water, then soaked in 10% sulfuric acid for several hours prior to use. The reactor was a continuous flow loop reactor, made of Kynar tubing with dimensions ⅝" diameter and 10 ft. length. The reactor had a centrifugal pump with a flow rate of 8 liters/hour. The calculated residence time of fluid in the loop reactor was about 2 minutes. A premix containing 44% sodium bromide, 55.95% water, and 0.05% sodium sulfite was prepared in a 5 gallon bucket with agitation. 210 gr/min of premix (92.4 gr/min sodium bromide, 117.5 gr/min water, and 0.1 gram/minute sodium sulfite) and 90 gr/min of 97% sulfuric acid (technical grade—9 ppm iron) were pumped into the loop reactor so that the molar ratio between sodium bromide and sulfuric acid was approximately 1:1.

The liquid coming out of the loop reactor was a mixture of hydrobromic acid, water, and sodium bisulfate at a temperature of approximately 72° C. The liquid was surged in a 22 liter flask at 75° C. and then pumped into the top of the carbon column at a flowrate of approximately 41 cc/min (66 gr/min). The concentration of iron before the carbon column was approximately 5 ppm. The concentration of iron after the carbon column was approximately less than 0.5 ppm for the first 35 hours, then approximately 0.5 ppm from 35 to 45 hours, then 1.5 ppm after 48 hours when the flow through the column was terminated.

The color of the sodium bisulfate residue after evaporating off the hydrobromic acid and water was white for the first 35 hours, cream colored from 35 to 45 hours, and orange at 48 hours.

Example 6

This example demonstrates the mitigation of color impact of iron bromide through removal of residual hydrobromic acid to the specified level. A mixture of hydrobromic acid, sodium bisulfate, and water are prepared using a continuous flow loop reactor as in Example 5. The reactor is a continuous flow loop reactor, made of Kynar tubing with dimensions 5/8" diameter and 10 ft. length. The reactor includes a centrifugal pump with a flow rate of 8 liters/hour. The calculated residence time of fluid in the loop reactor is about 2 minutes. A premix containing 44% sodium bromide, 55.95% water, and 0.05% sodium sulfite is prepared in a 5 gallon bucket with agitation. 210 gr/min of premix (92.4 gr/min sodium bromide, 117.5 gr/min water, and 0.1 gram/minute sodium sulfite) and 90 gr/min of 97% sulfuric acid (technical grade—10 ppm iron) are pumped into the loop reactor so that the molar ratio between sodium bromide and sulfuric acid is approximately 1:1.

The liquid coming out of the loop reactor is a mixture of hydrobromic acid, water, sodium bisulfate, and iron bromide (~60 ppm) at a temperature of approximately 72° C. The liquid is then split into three portions and each is evaporated to one of three temperatures (200° C., 230° C., and 250° C.). The three temperatures are selected such that the lowest temperature will not achieve the required residual hydrobromic acid level and that the two highest temperatures will achieve the required hydrobromic acid level.

The color of the sodium bisulfate samples corresponding to the three evaporation temperatures is given below in the table.

| Evaporation Temperature | Color (First 35 Hours) | Color (After 48 Hours) |
| --- | --- | --- |
| 200° C. | White | Orange |
| 230° C. | White | White |
| 250° C. | White | White |

The sodium bisulfate samples are also analyzed for residual hydrobromic acid and moisture. The table below gives these results.

| Evaporation Temperature | Residual Hydrobromic Acid | Residual Moisture |
| --- | --- | --- |
| 200° C. | 95 ppm | 0.30% |
| 230° C. | 40 ppm | 0.07% |
| 250° C. | 5 ppm | 0.02% |

Example 7

This example again demonstrates the mitigation of color impact of iron bromide through removal of residual hydrobromic acid to the specified level. A mixture of hydrobromic acid, sodium bisulfate, and water are prepared using a continuous flow loop reactor as in Example 5. The reactor is a continuous flow loop reactor, made of Kynar tubing with dimensions 5/8" diameter and 10 ft. length. The reactor includes a centrifugal pump with a flow rate of 8 liters/hour. The calculated residence time of fluid in the loop reactor is about 2 minutes. A premix containing 44% sodium bromide, 55.95% water, and 0.05% sodium sulfite is prepared in a 5 gallon bucket with agitation. 210 gr/min of premix (92.4 gr/min sodium bromide, 117.5 gr/min water, and 0.1 gram/minute sodium sulfite) and 90 gr/min of 97% sulfuric acid (technical grade—15 ppm iron) are pumped into the loop reactor so that the molar ratio between sodium bromide and sulfuric acid is approximately 1:1.

The liquid coming out of the loop reactor is a mixture of hydrobromic acid, water, sodium bisulfate, and iron bromide (~90 ppm) at a temperature of approximately 72° C. The liquid is then split into three portions and each is evaporated to one of three temperatures (200° C., 230° C., and 250° C.). The three temperatures are chosen such that the lowest two temperatures will not achieve the required residual hydrobromic acid level and that the highest temperature will achieve the required hydrobromic acid level.

The color of the sodium bisulfate samples corresponding to the three evaporation temperatures is given below in the table.

| Evaporation Temperature | Color (First 35 Hours) | Color (After 48 Hours) |
| --- | --- | --- |
| 200° C. | White | Orange |
| 230° C. | White | Orange |
| 250° C. | White | White |

The sodium bisulfate samples are also analyzed for residual hydrobromic acid and moisture. The table below gives these results.

| Evaporation Temperature | Residual Hydrobromic Acid | Residual Moisture |
| --- | --- | --- |
| 200° C. | 95 ppm | 0.30% |
| 230° C. | 40 ppm | 0.07% |
| 250° C. | 5 ppm | 0.02% |

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for the conversion of sodium bromide to anhydrous hydrobromic acid and sodium bisulfate, said process comprising the following sequential steps:
   a) reaction of sodium bromide and sulfuric acid in a solution of water to produce hydrobromic acid and sodium bisulfate wherein the conversion of sodium bromide is greater than about 99%;
   b) separation of hydrobromic acid and water from the sodium bisulfate; and
   c) separation of hydrobromic acid from water; followed by drying of hydrobromic acid.

2. A process according to claim 1 wherein the process further includes the step of absorption of iron bromide onto a solid adsorbent, before the separation of hydrobromic acid and water from the sodium bisulfate.

3. A process according to claim 2 wherein a chemical additive is included with the reaction of sodium bromide and sulfuric acid in a solution of water.

4. A process according to claim 1 wherein the separation of hydrobromic acid and water from the sodium bisulfate takes place at a temperature less than about 270° C.

5. A process according to claim 1 wherein the process further includes the step of solidifying the sodium bisulfate into a flaked, or granular form after the drying of hydrobromic acid.

6. A process according to claim 1 wherein the reaction step (a) uses a reactor device selected from the group consisting of tanks, columns, pipes, and mixtures thereof.

7. A process according to claim 5 wherein the reactor device is selected from the group consisting of columns, pipes, and mixtures thereof, and further comprises an internal blending device selected from the group consisting of orifice plates, segmented baffles, static mixers, and mixtures thereof.

8. A process according to claim 1 wherein the reactor device is a pipe and wherein the blending is provided solely by a pump which operates in a turbulent flow regime.

9. A process according to claim 5 wherein the temperature used for solidification is from about 180° C. to about 220° C.

10. A process according to claim 6 wherein the molar ratio of sulfuric acid to sodium bromide is from about 0.95 to about 1.05 and the ratio of sodium bromide to water is less than about 0.9 parts by weight sodium bromide to 1 part water.

11. A process according to claim 10 wherein the sulfuric acid is added slowly to the sodium bromide solution.

12. A process according to claim 10 wherein the temperature for the reaction is from about 20° C. to about 180° C. at one atmosphere pressure.

13. A process according to claim 6 wherein the separation of hydrobromic acid and water from the sodium bisulfate step (b) uses a separation device selected from the group consisting of evaporators, dryers, crystallizers, centrifuges, filters, and mixtures thereof.

14. A process according to claim 13 wherein the separation device is selected from the group consisting of evaporators, dryers, and mixtures thereof, wherein the evaporators are selected from the group consisting of forced circulation, vertical and horizontal tube, jacketed kettles, agitated thin film devices, and mixtures thereof and wherein the dryers are selected from the group consisting of pan dryers, indirect rotary dryers, fluidized beds, spray dryers, drum dryers, and mixtures thereof.

15. A process according to claim 14 wherein the separation device is a forced circulation evaporator.

16. A process according to claim 13 wherein the exposure time to temperatures above 200° C. during the separation step (b) is less than 10 minutes.

17. A process according to claim 14 wherein the separation device is an evaporator and the sodium bisulfate is in a molten state.

18. A process according to claim 1 wherein the separation of hydrobromic acid from water step (c) uses an approach selected from the group consisting of multi-stage distillation, liquid extraction, membrane separation, and mixtures thereof.

19. A process according to claim 18 wherein the step (c) approach is azeotropic distillation.

20. A process according to claim 19 wherein the step (c) approach is pressure swing azeotropic distillation.

21. A process according to claim 1 wherein the drying of hydrobromic acid step (d) results in a hydrobromic acid product having a moisture content of less than about 0.4%, by weight.

22. A process according to claim 21 wherein the drying of hydrobromic acid step (d) uses a drying approach selected from the group consisting of distillation, stripping, solids adsorption, gas separation membranes, gas absorption, or mixtures thereof.

23. A process according to claim 22 wherein the drying step (d) uses distillation.

24. A process for the conversion of sodium bromide to anhydrous hydrobromic acid and a sodium bisulfate coproduct, said process comprising the following sequential steps:
a) reaction of sodium bromide and sulfuric acid in a solution of water to produce hydrobromic acid and sodium bisulfate wherein the conversion of sodium bromide is greater than about 99% by means of an adiabatic ioop reactor and wherein the molar ratio of sulfuric acid to sodium bromide is from about 0.95 to about 1.05 and the ratio of sodium bromide to water is less than about 0.9 parts by weight sodium bromide to 1 part water;
b) separation of hydrobromic acid and water from the sodium bisulfate by means of a forced circulation evaporator;
c) separation of hydrobromic acid from water by means of azeotropic distillation; and
d) drying of hydrobromic acid.

25. A process for the conversion of sodium bromide to anhydrous hydrobromic acid and a sodium bisulfate coproduct, said process comprising the following sequential steps:
a) reaction of sodium bromide and sulfuric acid in a solution of water to produce hydrobromic acid and sodium bisulfate wherein a chemical additive is included with the reaction of sodium bromide and sulfuric acid in the solution of water; wherein the conversion of sodium bromide is greater than about 99%, by means of an adiabatic loop reactor and wherein the molar ratio of sulfuric acid to sodium bromide is from about 0.95 to about 1.05 and the ratio of sodium bromide to water is less than about 0.9 parts by weight sodium bromide to 1 part water;
b) absorption of iron bromide onto a solid adsorbent;
c) separation of hydrobromic acid and water from the sodium bisulfate by means of a forced circulation evaporator;
d) separation of hydrobromic acid from water by means of azeotropic distillation;
e) drying of hydrobromic acid; and
f) solidifying the sodium bisulfate into a form selected from the group consisting of flaked, granular, and mixtures thereof.

26. A process for the conversion of sodium bromide to anhydrous hydrobromic acid and a sodium bisulfate coproduct, said process comprising the following sequential steps:
a) reaction of sodium bromide and sulfuric acid in a solution of water to produce hydrobromic acid and sodium bisulfate wherein a chemical additive is included with the reaction of sodium bromide and sulfuric acid in the solution of water; wherein the conversion of sodium bromide is greater than about 99%, by means of an adiabatic loop reactor and wherein the molar ratio of sulfuric acid to sodium bromide is from about 0.95 to about 1.05 and the ratio of sodium bromide to water is less than about 0.9 parts by weight sodium bromide to 1 part water;
b) separation of the hydrobromic acid and water from the sodium bisulfate by means of a forced circulation evaporator at a temperature less than about 270° C.;
c) separation of the hydrobromic acid from water by means of azeotropic distillation;
d) drying of the hydrobromic acid; and
e) solidifying the sodium bisulfate into a form selected from flaked, granular, and mixtures thereof.

* * * * *